A. WORPITZ.
TRANSMISSION MECHANISM.
APPLICATION FILED JUNE 3, 1918.
1,313,776.
Patented Aug. 19, 1919.
5 SHEETS—SHEET 2.
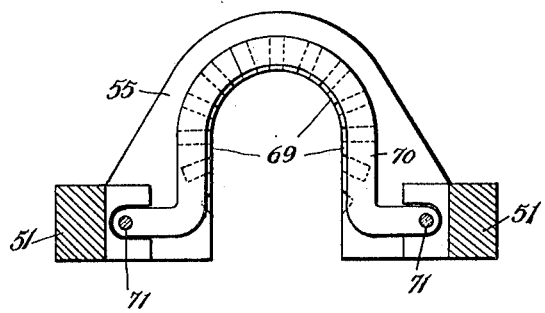
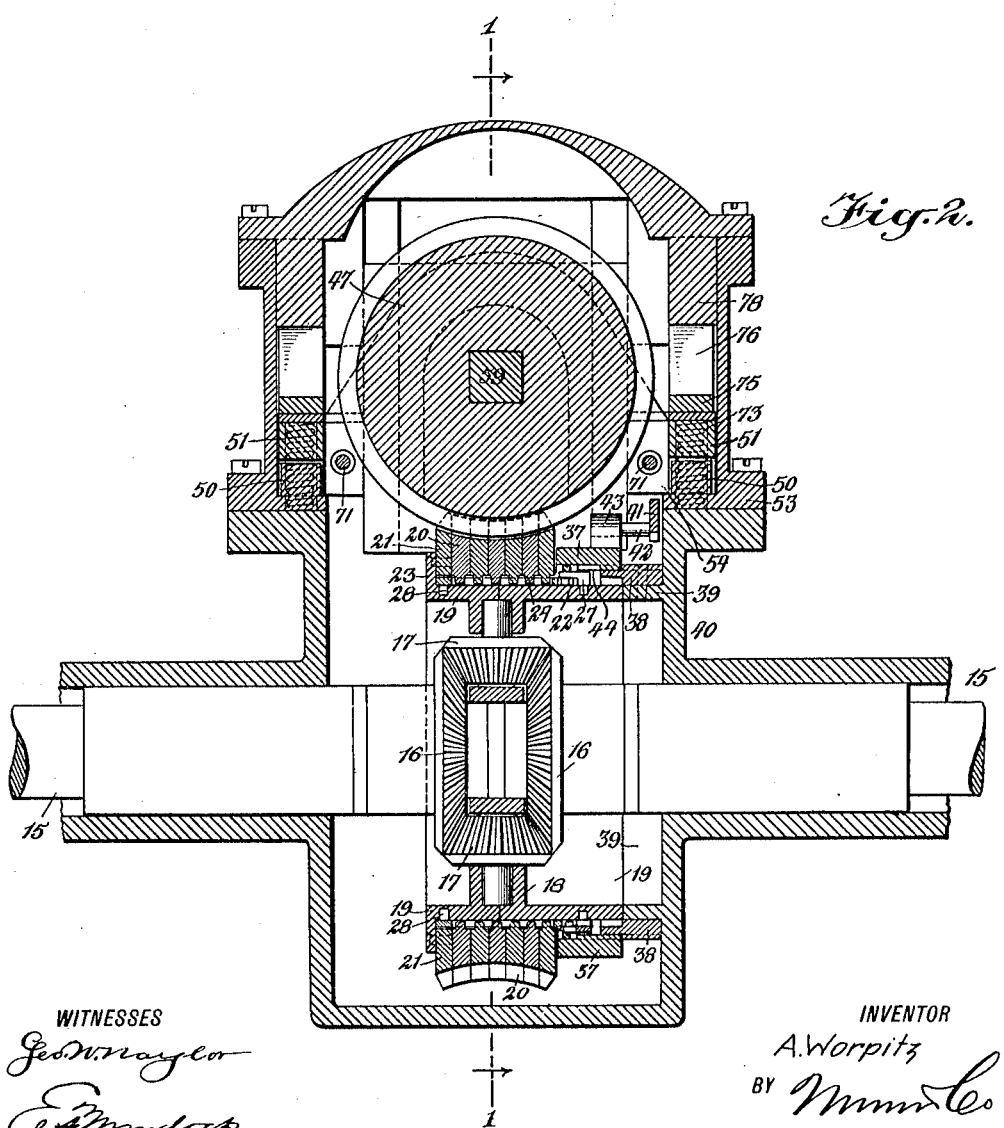
WITNESSES
INVENTOR
A. Worpitz
BY
ATTORNEYS

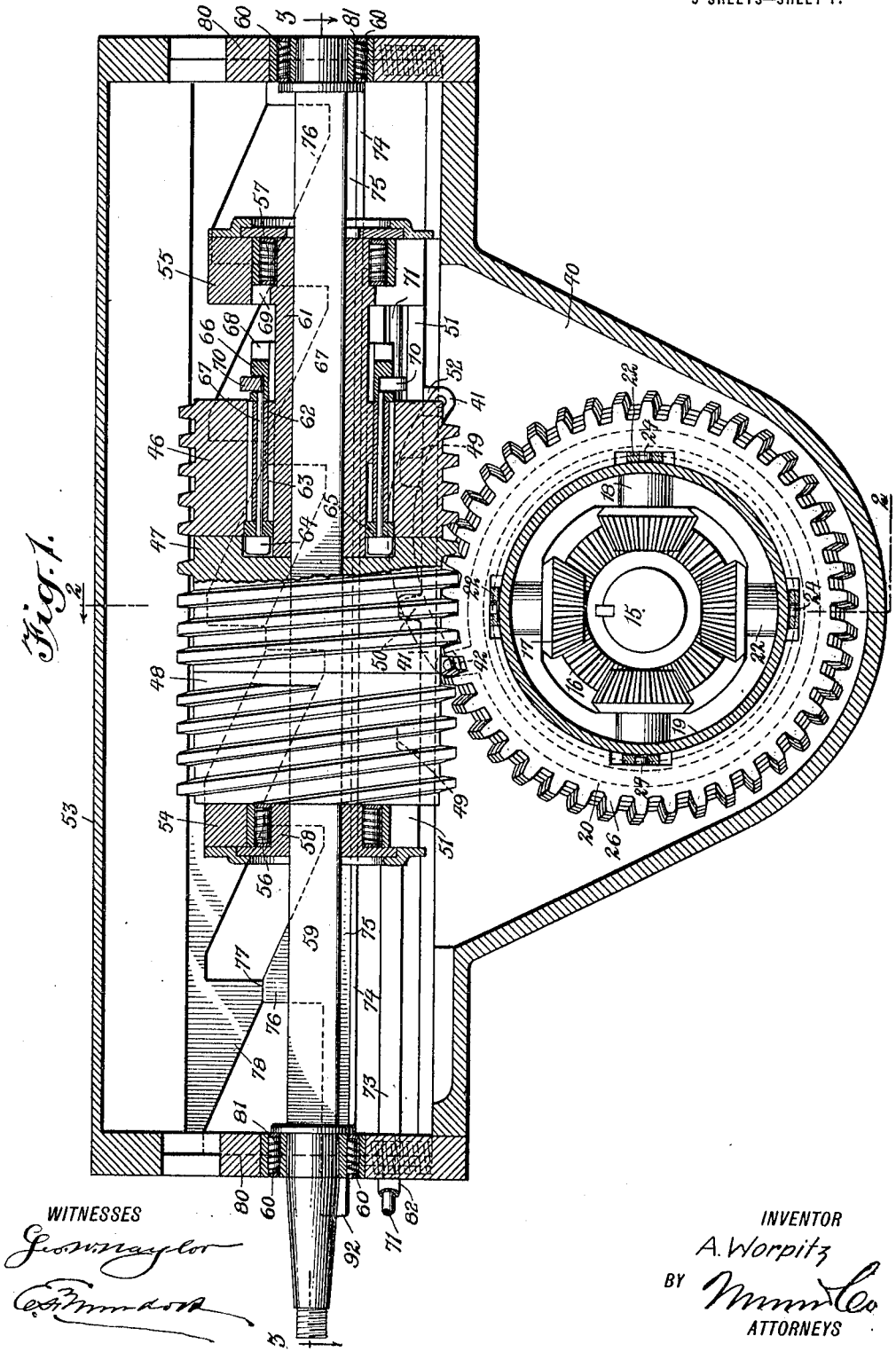

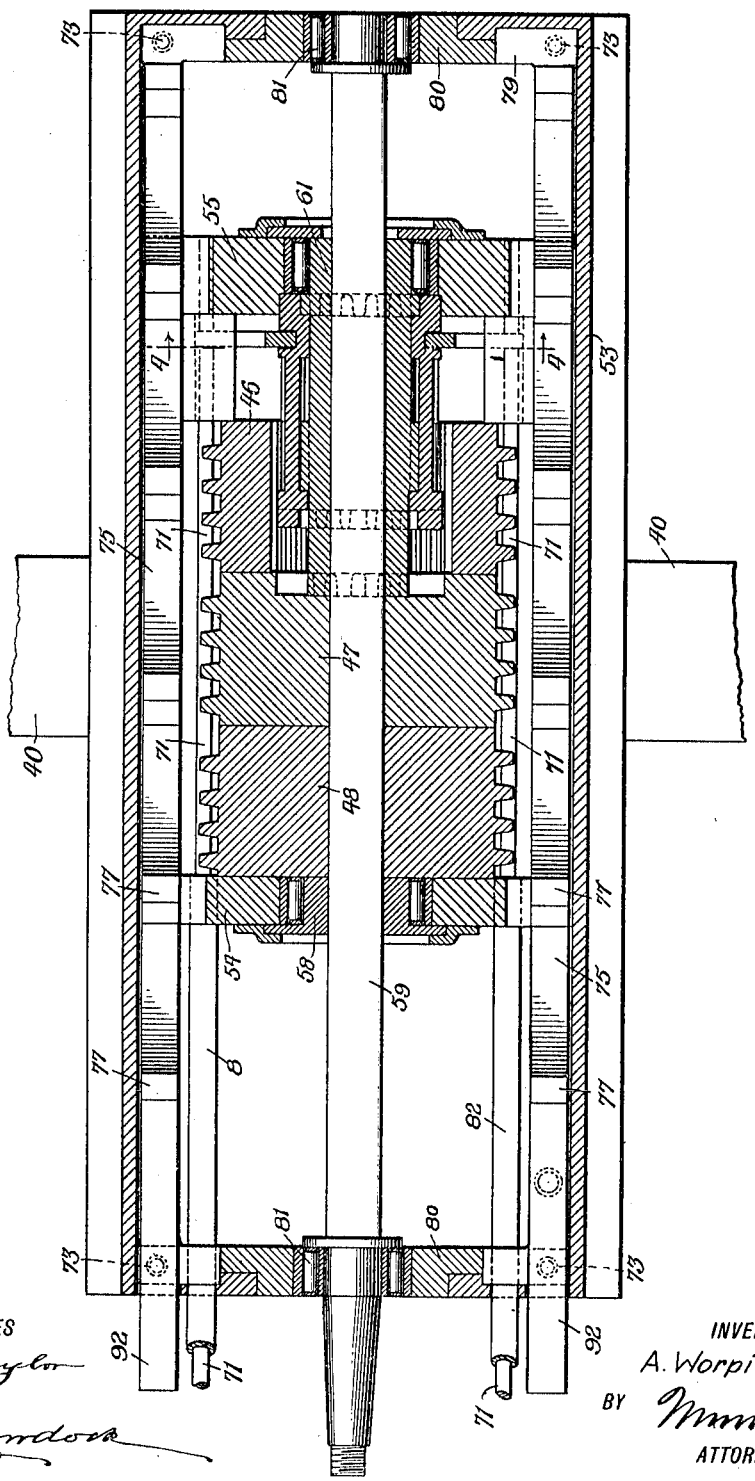

A. WORPITZ.
TRANSMISSION MECHANISM.
APPLICATION FILED JUNE 3, 1918.

1,313,776.

Patented Aug. 19, 1919.
5 SHEETS—SHEET 4.

WITNESSES

INVENTOR
A. Worpitz
BY
ATTORNEYS

A. WORPITZ.
TRANSMISSION MECHANISM.
APPLICATION FILED JUNE 3, 1918.
1,313,776.
Patented Aug. 19, 1919.
5 SHEETS—SHEET 5.
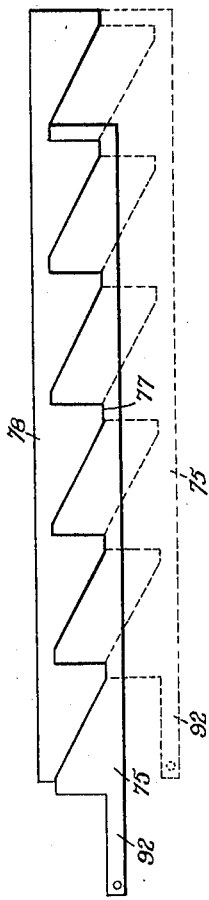
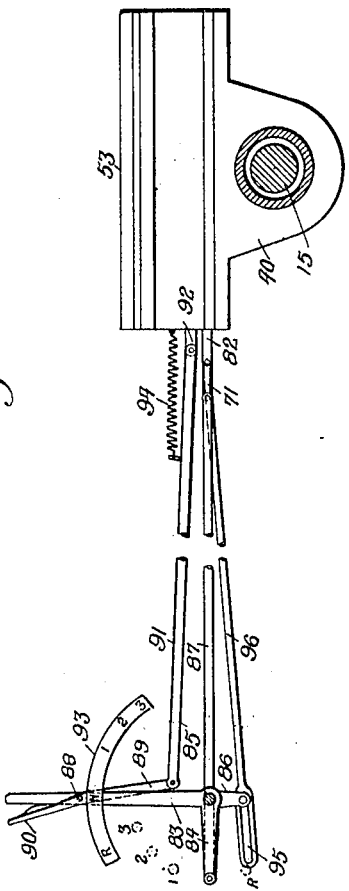
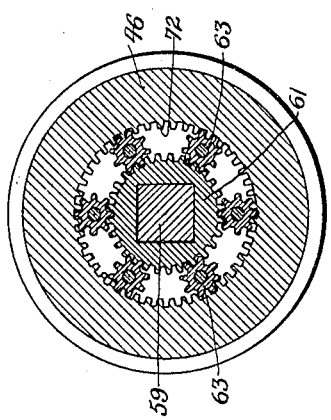
WITNESSES
INVENTOR
A. Worpitz
BY
ATTORNEYS

UNITED STATES PATENT OFFICE.

ALFRED WORPITZ, OF NEW YORK, N. Y.

TRANSMISSION MECHANISM.

1,313,776.  Specification of Letters Patent.  Patented Aug. 19, 1919.

Application filed June 3, 1918. Serial No. 237,975.

*To all whom it may concern:*

Be it known that I, ALFRED WORPITZ, a citizen of the United States, and a resident of the city of New York, borough of Manhattan, in the county and State of New York, have invented a new and Improved Transmission Mechanism, of which the following is a full, clear, and exact description.

Among the principal objects which the present invention has in view are: to provide for shifting a worm-driven transmission gear to vary the effect thereof; to furnish a worm-driven transmission gear wherein the worm wheel is altered to conform with worm gears of various pitch; to adopt a single worm wheel for coöperating with a series of worms of different pitch; to reverse the transmitted direction of a worm gear.

*Drawings.*

Figure 1 is a longitudinal section of a transmission gear constructed and arranged in accordance with the present invention, the section being taken as on the line 1—1 in Fig. 2;

Fig. 2 is a cross section thereof, the section being taken as on the line 2—2 in Fig. 1;

Fig. 3 is a longitudinal plan section, the section being taken as on the line 3—3 in Fig. 1;

Fig. 4 is a detail view in cross section of a shifting yoke with which the mechanism is provided, the section being taken as on the line 4—4 in Fig. 3;

Fig. 9 is a detail view showing fragments of the mechanism for disengaging and shifting the worm and worm wheel;

Fig. 10 is a detail view showing diagrammatically and on a reduced scale, manual controls for shifting the worm gear;

Fig. 11 is a cross section of the reversing segment of the worm gears.

*Description.*

Figure 5:
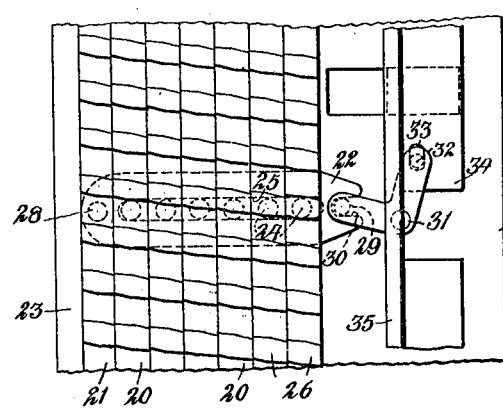
Fig. 5 is a detail view in plan, showing a fragment of the worm wheel and a section of the shifting mechanism attached thereto.
Figure 6:
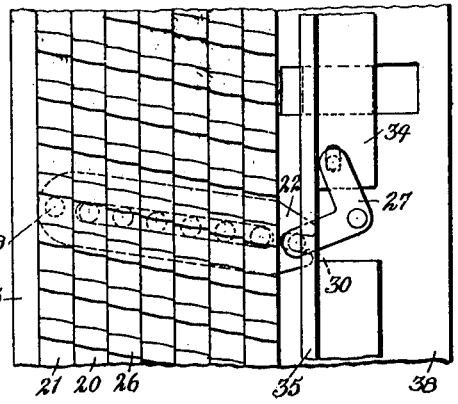
Fig. 6 is a similar view showing the detail of the gear wheel adjusted to a different position.

Driving axles employing a connection differential mechanism such as shown, are usually divided. The inner end of each axle 15 is provided with a bevel gear 16, with which a series of pinions 17 are operatively engaged. The pinions 17 are mounted in bearings 18, inwardly extended from the felly rim 19. The rim 19 forms a support for a series of relatively thin toothed disk rings 20 and 21, and shifting links 22 operatively connected with said rings. The ring 21 is stationary on the felly rim 19 and is made fast to a side flange 23 of the said rim, as seen best in Fig. 2 of the drawings. The rings 20 are nested in laminated arrangement and are slidable on the rim 19. To this end, each of the rings 20 has an extension 24, which, as best seen in Figs. 5 and 6, rests within a slot 25 of the link 22. The teeth 26 formed on the rings 20 are curved lengthwise to avoid presenting sharp corners to the threads of the worm segments. As shown in said Figs. 5 and 6, the rings 20 are moved conformably with the swing of the links 22 and the bell cranks 27 controlling the said links.

As seen in Fig. 1 of the drawings, there are four links 22. Each of these links has a pivot 28, as shown in Fig. 2, said pivots being disposed adjacent the flange 23 and below the ring 21. The bell crank 27 has a pin 29, which extends within the notch 30 formed at the end of each of the links 22. The bell cranks 27 are pivoted by pins 31 on the felly rim 19.

The end of the extension of the bell crank opposite that above described, has a pin 32. The pin 32 is engaged by a slot 33 in the shifting collar 34, which functions to move toward and away from the rings 20, as seen by comparison of Figs. 5 and 6.

Figure 8:
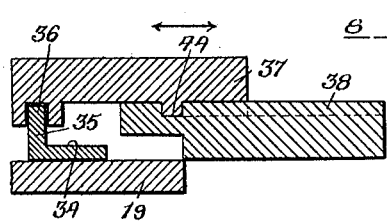
Fig. 8 is a cross section of a portion of the tooth-shifting mechanism with which the wheel is provided.
Figure 7:
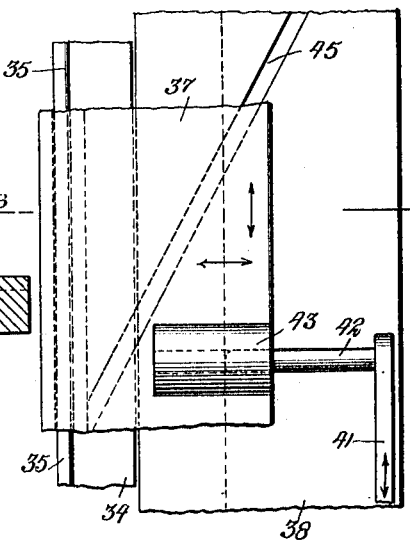
Fig. 7 is a detail view on an enlarged scale, showing a section of the shifting mechanism with which the worm wheel is provided.

The collar 34 is held in guided relation to the felly rim 19, and is provided with an upstanding flange 35, which is engaged by a groove 36 at the outer end of a rocking band 37. As seen best in Figs. 7 and 8, the band 37 is slidably mounted on a cylindrical bench 38, which, as seen best in Fig. 2 of the drawings, is stationary, and structurally connected with a flange 39 on the gear case 40. It will be noted in Fig. 2 of the drawings, that the flange 39 forms an end thrust bearing for the felly rim 19. The band 37 is rocked around the bench 38 by means of the connecting link 41. The link 41 has at the end thereof, a pin 42, which is slidably mounted in a socket bore in the lug 43 on the band 37. The band 37 is moved with respect to the bench 38 and the rings 20. To this end, the band has a fin 44, extended from the under side thereof to rest in a groove 45 angularly disposed in the bench 38. By reason of this connection, whenever the band 37 is shifted circumferentially on the bench 38, the said band is moved laterally thereon, and by reason of the connection between the said band and the collar 34, the collar is also laterally moved to rock the bell cranks 27 and the links 22, thereby changing the angle of the teeth 26 on the rings 20 with reference to the axis of the worm gear formed thereby about the felly rim 19.

The construction and arrangement of the groove 45 and bell cranks 27, are such that the angular disposition of the teeth 26 corresponds with the pitch of the worm segments 46, 47 and 48, when said segments are centrally located with reference to the vertical plane coincident with the axis of the felly rim 19 and axles 15. To insure this adjustment of the various segments, the frame supporting the same is provided with a series of notches 49, as shown by dotted lines in Fig. 1 of the drawings. The notches 49 operate to center the frame carrying the said segments with reference to the said segments by being seated on the alining spurs 50, also shown in said figure by dotted lines when, as hereinafter explained, the said segments are lowered so that the threads thereon engage the teeth 26 of the worm gear wheel formed thereby. The notches 49 above referred to are provided in the side bars 51 of the frame supporting the said segments, and the link 41 operatively attached to the band 37 is pivotally connected with one of the said side bars 51 by a pendent lug 52, as is shown in Fig. 1 of the drawings. The spur 50, as shown in Fig. 2 of the drawings, is integral with the side plates of the housing 53, which rests above the casing 40 to form a runway for the worm segments and supports therefor. The side bars 51, as seen best in Fig. 1 of the drawings, are connected at the ends thereof, by yokes 54 and 55, the latter being shown in Fig. 4 of the drawings. The said yokes support roller bearings 56 and 57. The bearings have a cone block 58, in which is slidably mounted a rectangular shaft 59, which, in turn, is supported in roller bearings 60 at the opposite ends of the housing 53.

The segments 47 and 48 are slidably mounted on the shaft 59. The segment 46 is mounted to rotate around a sleeve 61, which sleeve is slidably mounted on the shaft 59 and forms a cone for the bearing 57. The sleeve 61 has situated at about the center thereof, a ring of gear teeth 62, said teeth meshing with those of a series of elongated toothed pinions 63, which, as hereinafter explained, serve to reverse the rotation imparted to the segment 46 for reversing the worm wheels and axles 15 operatively connected therewith. Usually, the segment 46 is locked to the segment 47, by means of teeth 64 extended beyond the ring 65. The rings 65 and 66 form bearings for shafts 67, on which the toothed pinions 63 are mounted. The ring 66 has a series of teeth 68 adapted to engage teeth 69 in the yoke 55. The teeth 68 are engaged with the teeth 69 only when the yoke 70 is forced by means of the rods 71 toward the yoke 55. The yoke 70 fits a clutch groove in the ring 66, as shown best in Fig. 1 of the drawings.

Whenever this action occurs, it will be observed that the teeth 64 are drawn out of engagement with the segment 47, which releases the segment 46 and permits the same to be driven by the pinions 63, the teeth of the sleeves 61 being engaged with the teeth of the said pinions to this end. It will be noted that when the teeth 68 engage the teeth 69 in the yoke 55, which does not rotate, the series of shafts 67 are held from traveling around the center of the shaft 59, and transmit to the segment 46, through the internal teeth 72, with which the said segment is provided, a rotary movement, the opposite of that performed by the shaft 59 and the segments 47 and 48. If at this time the segment 46 is in mesh with the teeth 26 of the worm gear, the said worm gear and axles 15 connected therewith will be rotated in a direction the reverse of that imparted by the segments 47 and 48, or by the segment 46 when the teeth 64 are engaged with the segment 47.

As stated above, the pitches of the threads on the segments 46, 47 and 48 are different. The pitches are progressive or coarser in the order named, that is, the pitch of the thread on the segment 46 is slight so as to impart the least rotary movement to the worm wheel corresponding to what is known in automobiling as the first speed. The thread on the segment 47 is of coarser pitch to impart a more rapid rotation to the gear wheel and axles 15. This corresponds with what is known as second speed. The pitch of the threads on the segment 48 is the greatest and imparts a proportional greater speed to the rotation of the worm gear wheel. This corresponds with the third speed. It is obvious that to shift the segments 46, 47 and 48, to obtain the variation in speeds referred to, it is necessary to lift the said segments out of engagement with the worm wheel, and to reengage the worm wheel by one or other of the said segments when desired to propel the vehicle.

With the above-mentioned object in view, lifting springs 73 are provided. These springs are mounted in sockets in extensions 79 to bear on the housing 53. The wearing plates 74 form rests for lock rails 75. The rails 75 have a series of cam-shaped members 76. The members 76 have flat dwells 77, which correspond with and rest upon flat surfaces at the ends of the inverted cam members 78. The cam members 78 are stationary in the housing 53, the rails 75 with the cam members 76 are movable lengthwise thereof.

It is obvious that when the rails 75 are so moved, the springs 73 are permitted to lift the extensions 79 and the bearing plates 80 at the opposite ends of the housing. The bearing plates 80 are provided with roller bearings 81, wherein bearings of the shaft 59 are disposed. It is obvious that when the shaft 59 is elevated, the segments 46, 47 and 48 and parts connected therewith are likewise elevated. The shifting rods 82 and the reversing rods 71 are supported in bearings in the forward plate 80, and are elevated therewith and with the yokes 54 and 55 in which they are also supported.

For shifting the segments 46, 47 and 48, and for altering the pitch of the teeth 26, the vehicle is provided with a manually-operated lever 83. The lever 83 has a pivot 84 and crank arms 85 and 86. The crank arm 85 is connected by a link 87, with the tubular rods 82, which rods are permanently secured to the yoke 54 of the frame supporting the segments above mentioned.

Pivotally mounted by the pin 88 upon the lever 83, is a hand grip lever 89, the grip 90 whereof is engaged by the hand of the driver whenever intending to move the lever 83. The end of the lever 89 is operatively connected by the rod 91 with the extensions 92 of the lock rails 75. By this arrangement, the rails 75 are shifted from the locking position shown by dotted lines in Fig. 9, to the releasing position shown by full lines in said figure, preliminary to moving the lever 83 and parts connected therewith. The movement of the lever 83 is ascertained by the markings on a quadrant 93, the positions being indicated by the characters "N", "1", "2", "3", and "R".

As above described when the rails 75 are in the releasing position, the segments 46, 47 and 48 are lifted from engagement with the teeth 26 of the worm wheel. In this position, the said segments and supporting frame including the yokes 54 and 55, may be shifted lengthwise of the shaft 59. When the lever 83 is in the position indicated on the quadrant by the letter "N", said segments and frame are in the advanced position or at the forward end of the housing 53, and the segments 46 is out of engagement with the worm wheel. This is what is styled the neutral position and the parts are locked in this position by the rails 75, when the grip 90 is released, and the spring 94 is permitted to retract the locking rails 75 to thereafter hold the segments and parts connected therewith from shifting. To shift the lever 83 to the position on the quadrant 93 indicated by the numeral "1", the operator grasps the lever 83 and the grip 90. The lever 89 is first advanced to move the rails 75 to their releasing position, resulting in lifting the segments above the plane of engagement thereof with the teeth 26 of the worm wheel. In this position, it will be observed that the lever 83 may be moved to the position indicated by the numeral "1", "2", or "3", thereby placing in position to engage the teeth 26 of the worm wheel, first, the segment 46, second, the segment 47, and, third, the segment 48.

When the lever 83 is in the neutral position, the reversing mechanism embodying the pinions 63, may be thrown into operative relation by moving the lever 83 to the position indicated on the quadrant 93, by the character "R". It will be noted that in this movement, the short arm 86 engages the end of a loop 95 of the rod 96. The rod 96 is operatively connected with the rods 71, which rods are connected with the yoke 70. The yoke 70, as explained above, when shifted, releases the engagement of the teeth 64 with the segment 47, and engages the teeth 68 with the teeth 69 of the yoke 55. The latter engagement arrests the rotation of the rings 65 and 66, and the rotary travel of the pinions 63. The pinions 63 are then driven by the teeth 62 on the sleeve 61, which rotates with the shaft 59. The teeth of the pinions 63 being meshed with the interior gear teeth 72 on the segment 46, the latter is driven by the rotation of the shaft 59 in a direction opposite to that traveled by said shaft. When the thread on the segment 46 is engaged with the teeth 26, it will be seen that the worm wheel and axles 15 operatively connected therewith are revolved in a rotary direction opposite that usually imparted thereto.

Claims.

1. A transmission mechanism incorporating a plurality of worm segments, the threads whereof are disposed at different angles; a worm wheel having teeth disposable for correspondence with the angles of the threads on all of said segments; and means for lifting said segments from engagement with said wheel.

2. A transmission mechanism as characterized incorporating a transmission shaft; movable bearings for said shaft; means for operatively raising said shaft; means for mechanically lowering said shaft; means for locking said shaft in lowered position; and a plurality of worm segments slidably and non-rotatively mounted on said shaft; and a worm wheel disposed in line with and below said shaft and said segments, said wheel being adjustable so that the angle of the teeth of said wheel may correspond with the angles of the threads on all of said segments.

3. A transmission mechanism as characterized incorporating a transmission shaft; movable bearings for said shaft; means for operatively raising said shaft; means for mechanically lowering said shaft; means for locking said shaft in lowered position; a plurality of worm segments slidably and non-rotatively mounted on said shaft; a worm wheel disposed in line with and below said shaft and said segments, said wheel being adjustable so that the angle of the teeth of said wheel may correspond with the angles of the threads on all of said segments, and means manually controlled for shifting said segments and the teeth of said wheel simultaneously.

4. A transmission mechanism as characterized incorporating a transmission shaft; movable bearings for said shaft; means for operatively raising said shaft; means for mechanically lowering said shaft; means for locking said shaft in lowered position; a plurality of worm segments slidably and non-rotatively mounted on said shaft; a worm wheel disposed in line with and below said shaft and said segments, said wheel being adjustable so that the angle of the teeth of said wheel may correspond with the angles of the threads on all of said segments; and means manually controlled for shifting said segments and the teeth of said wheel simultaneously and correspondingly.

5. A transmission mechanism comprising a transmission shaft; a series of worm gear segments slidably and non-rotatably mounted thereon; a worm wheel for engaging said segments, said wheel being formed of laminated toothed sections, said sections being movable to vary the working angle of said wheel in correspondence with the angles of all of said segments; and means for shifting said segments for engaging the teeth of the wheel with each of said segments successively and for arranging the pitch of the teeth of said wheel correspondingly, said means embodying manually-controlled mechanism for separating said wheel and said segments prior to readjusting the working arrangement thereof.

6. A transmission mechanism comprising a transmission shaft; a series of worm gear segments slidably and non-rotatably mounted thereon; a worm wheel for engaging said segments, said wheel being formed of laminated toothed sections, said sections being movable to vary the working angle of said wheel in correspondence with the angles of all of said segments; means for shifting said segments for engaging the teeth of the wheel with each of said segments successively and for arranging the pitch of the teeth of said wheel correspondingly, said means embodying manually-controlled mechanism for separating said wheel and said segments prior to readjusting the working arrangement thereof; and means for reëngaging said wheel and one of said segments.

7. A transmission mechanism comprising a transmission shaft; a series of worm gear segments slidably and non-rotatably mounted thereon; a worm wheel for engaging said segments, said wheel being formed of laminated toothed sections, said sections being movable to vary the working angle of said wheel in correspondence with the angles of all of said segments; means for shifting said segments for engaging the teeth of the wheel with each of said segments successively and for arranging the pitch of the teeth of said wheel correspondingly, said means embodying manually-controlled mechanism for separating said wheel and said segments prior to readjusting the working arrangement thereof; means for reëngaging said wheel and one of said segments; and means for locking said wheel in engagement with said segments.

8. A transmission mechanism comprising a worm wheel embodying a plurality of laminated toothed disk rings; and means for varying the service relation of said rings.

9. A transmission mechanism comprising a worm wheel embodying a plurality of laminated toothed disk rings; and means manually controlled for varying the service relation of said rings 10. A transmission mechanism comprising a worm wheel embodying a rigid felly rim; a plurality of laminated thin toothed rings, the diameters of said rings being varied to form when assembled, a toothed crown for said wheel, said crown being convex to conform with worms for engaging said wheel; and means manually operable for shifting circumferentially the said rings to change the angular relation of the assembled teeth of said wheel.

ALFRED WORPITZ.

Copies of this patent may be obtained for five cents each, by addressing the "Commissioner of Patents, Washington, D. C."